United States Patent
Murdoch et al.

(10) Patent No.: US 7,502,404 B2
(45) Date of Patent: Mar. 10, 2009

(54) OPTICAL PUMPING METHOD FOR GAIN-MEDIA WITH POLARIZATION SENSITIVE ABSORPTION

(75) Inventors: Keith M. Murdoch, San Jose, CA (US); Steven M. Jarrett, Los Altos, CA (US); Edward D. Reed, Sunnyvale, CA (US)

(73) Assignee: Coherent, Inc., Santa Clara, CA (US)

( * ) Notice: Subject to any disclaimer, the term of this patent is extended or adjusted under 35 U.S.C. 154(b) by 215 days.

(21) Appl. No.: 11/584,386

(22) Filed: Oct. 20, 2006

(65) Prior Publication Data

US 2008/0095210 A1    Apr. 24, 2008

(51) Int. Cl.
*H01S 3/091* (2006.01)
(52) U.S. Cl. .......................... 372/70; 372/22
(58) Field of Classification Search ................. 372/22, 372/92, 27, 69, 71, 107; 359/328
See application file for complete search history.

(56) References Cited

U.S. PATENT DOCUMENTS

| | | | | |
|---|---|---|---|---|
| 5,317,447 | A * | 5/1994 | Baird et al. | 359/328 |
| 5,854,802 | A * | 12/1998 | Jin et al. | 372/22 |
| 6,417,961 | B1 | 7/2002 | Sun et al. | 359/337.5 |
| 6,898,231 | B2 * | 5/2005 | Butterworth | 372/71 |
| 6,940,880 | B2 * | 9/2005 | Butterworth et al. | 372/22 |
| 2004/0042522 | A1 * | 3/2004 | Sutter et al. | 372/70 |
| 2004/0101015 | A1 | 5/2004 | Butterworth | 372/70 |

FOREIGN PATENT DOCUMENTS

| | | | |
|---|---|---|---|
| EP | 1 085 621 | A2 | 3/2001 |
| EP | 1 482 607 | A1 | 12/2004 |
| GB | 2 298 082 | A | 8/1996 |

OTHER PUBLICATIONS

L. McDonagh, et al., "50 W, 5 ns, high repetition rate Cavity-Dumped Q-switched $TEM_{00}$ $Nd:YVO_4$ Oscillator," *Post Deadline Paper PDP4, Advanced Solid-State Photonics Meeting*, Lake Tahoe, Jan. 2006, 3 pages in length.

L. McDonagh et al., "Optimized pumping of $Nd:YVO_4$ with polarization-insensitive absorption for high power applications," *Proceedings of the CLEO 2005* [*published by the Optical Society of America*], Paper No. CMS5 (2005), 3 pages in length.

(Continued)

*Primary Examiner*—Minsun Harvey
*Assistant Examiner*—Tuan N. Nguyen
(74) *Attorney, Agent, or Firm*—Stallman & Pollock LLP

(57) ABSTRACT

A method for optically pumping a gain-medium with partially polarized or unpolarized pump-light having a wavelength at which that gain-medium has an absorption that is dependent on the polarization plane of the pump-light is disclosed. The pump-light is directed into the gain-medium. The strongest-absorbed polarization component of the pump-light is substantially absorbed and the weakest-absorbed polarization component is partially transmitted by the gain-medium. The polarization plane of the transmitted component is rotated through 90 degrees and the polarization-rotated pump-light is directed back into the gain-medium, wherein it is substantially absorbed.

15 Claims, 2 Drawing Sheets

OTHER PUBLICATIONS

D.G. Falquier et al., "A Polarization-Stable Er-Doped Superfluorescent Fiber Source Including a Faraday Rotator Mirror," *IEEE Photonics Technology Letters*, vol. 12, No. 11, Nov. 2000, pp. 1465-1467.

T. Luo et al., "Polarization-Insensitive Single-Pump Optical Parametric Amplifier by Depolarization of the Pump," *Optical Fiber Communication Conference* (Los Angeles, California), Feb. 23-25, 2004, 3 pages in length.

K.I. Martin et al., "High-power single-frequency operation, at 1064 nm and 1061.4 nm of a Nd:YAG ring laser end-pumped by a beam-shaped diode bar," *Optics Communications*, vol. 135, Feb. 1, 1997, pp. 89-92.

C. Yu et al., "Polarization-Insensitive All-Optical Wavelength Conversion Using Dispersion-Shifted Fiber With a Fiber Bragg Grating and a Faraday Rotator Mirror," *IEEE Photonics Technology Letters*, vol. 16, No. 8, Aug. 2004, pp. 1906-1908.

* cited by examiner

OPTICAL PUMPING METHOD FOR GAIN-MEDIA WITH POLARIZATION SENSITIVE ABSORPTION

TECHNICAL FIELD OF THE INVENTION

The present invention relates to diode-pumped solid-state (DPSS) lasers. The invention relates in particular to pumping DPSS lasers having a gain-medium with polarization sensitive absorption.

DISCUSSION OF BACKGROUND ART

A preferred gain-medium for high-power DPSS lasers is neodymium-doped yttrium orthovanadate ($Nd:YVO_4$). This material can be optically pumped at several diode-laser wavelengths, including 808 nanometers (nm), 816 nm, and 880 nm. Longitudinal-pumping (end-pumping) is a preferred pumping method. For DPSS lasers having a fundamental output greater than about 1 Watt (W), the pump-light is usually supplied by an array of diode-laser emitters.

In end-pumping arrangements, light from individual diode emitters is collected by an optical fiber array, which is formed into a bundle. Light from the fiber bundle is usually collimated and focused into the gain-medium by one or more lens elements. Sometimes, an additional multi-mode optical fiber is used to transport the pump beam from the fiber bundle to the collimation and focusing optics. Light from the diode-emitters is strongly plane polarized, but becomes substantially depolarized during transmission through the fiber array and any transport fiber. This creates a problem for optimizing the pumping of $Nd:YVO_4$ when the absorption of pump-light is polarization sensitive, which is the case for many of the preferred pump-light wavelengths. The absorption spectrum of $Nd:YVO_4$ and other polarization sensitive gain-media is usually described in terms of pi ($\pi$) and sigma ($\sigma$) components, representing absorption in two orthogonal polarization orientations corresponding to crystal axes of the gain-media.

By way of example, FIG. 1 schematically illustrates the pi and sigma polarized absorption spectra of $Nd:YVO_4$ at wavelengths between 725 nm and 900 nm. The peak absorption at 808 nm is about 4 times stronger in the pi polarization than in the sigma polarization. The peak absorption around 880 nm is at least 7 times stronger in the pi polarization than in the sigma-polarization.

In gain-media with polarization-dependent absorption spectra there may be discrete wavelengths at which these spectra intersect, i.e., wavelengths at which the pi and sigma absorptions are equal. Pumping at these wavelengths can be optimized for partially polarized or un-polarized pump-light. Such a pumping scheme is described in U.S. Pat. No. 6,898,231 assigned to the assignee of the present invention. In this scheme, $Nd:YVO_4$ is pumped at a wavelength of 816 nm, a wavelength at which the pi and sigma absorption spectra of the material intersect. In a paper "*Optimized Pumping of NdYVO$_4$ with Polarization Insensitive Absorption for High-Power Applications*", McDohough et al., Paper No. CMS5, Proceedings of CLEO 2005, published by the Optical Society of America, a scheme is described where $Nd:YVO_4$ is pumped at a wavelength of 888 nm, which is another wavelength at which the pi and sigma absorption spectra of the material intersect.

One problem with such pumping schemes is that these discrete wavelengths do not occur at peaks in the absorption spectra and the absorption is relatively weak. This can be compensated by increasing gain-medium length, however, this leads to difficulty in mode-matching the pump beam to the lasing mode in the gain-medium. This can be overcome by using a relatively high doping concentration. However, high doping concentrations can lead to reduced optical-pump to optical-output efficiency due to inter-ion energy-transfer processes, such as energy upconversion and cross-relaxation quenching.

In order to optimize the optical to optical efficiency, essentially all the pump-light delivered to a gain-medium should be absorbed by the gain-medium. To achieve this with a partially-polarized or unpolarized-light pump beam, at a wavelength where the pi and sigma absorptions are substantially different (which is usually the case at absorption peaks) the doping concentration of the gain-medium and the length of the gain-medium need to be selected so essentially all of the pump-light in the weakly-absorbed polarization is absorbed over the full length of the gain-medium. This would, however, mean pump-light in the strongly-absorbed orientation would be absorbed over a comparatively short length of the gain-medium. This produces significant local heating. The resulting temperature gradients can cause aberrations in thermal lensing of the gain-medium, and can be sufficient to crack the gain-medium. There is a need for a more reliable method of pumping a polarization-sensitive gain-medium with partially polarized or unpolarized light at wavelengths corresponding to the peaks in the absorption spectrum of the gain-medium.

SUMMARY OF THE INVENTION

The present invention is directed to a method of optically pumping a gain-medium. In one aspect, the method comprises directing optical pump-light into the gain-medium. A doping concentration and a length of the gain-medium are selected such that a residual portion of the pump-light is transmitted by the gain-medium. The residual pump-light is transmitted through a birefringent element. The residual pump-light transmitted through the birefringent element is then reflected back through the birefringent element and back into the gain-medium.

In another aspect of the inventive pumping method, the gain-medium has an absorption that is different for two orthogonal polarizations. The doping concentration and the length of the gain-medium are selected so most of the pump beam in the strongly-absorbed polarization is absorbed along the whole length of the gain-medium. The residual portion of the pump-light exiting the gain-medium will be mostly in the weakly absorbed polarization. The residual pump-light passes through the birefringent element and is directed back through the birefringent element and back into the gain-medium by a mirror. The birefringent element is selected such that the residual pump-light re-enters the gain-medium in the strongly-absorbed polarization. Essentially all the residual beam is absorbed in the second pass through the gain-medium.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
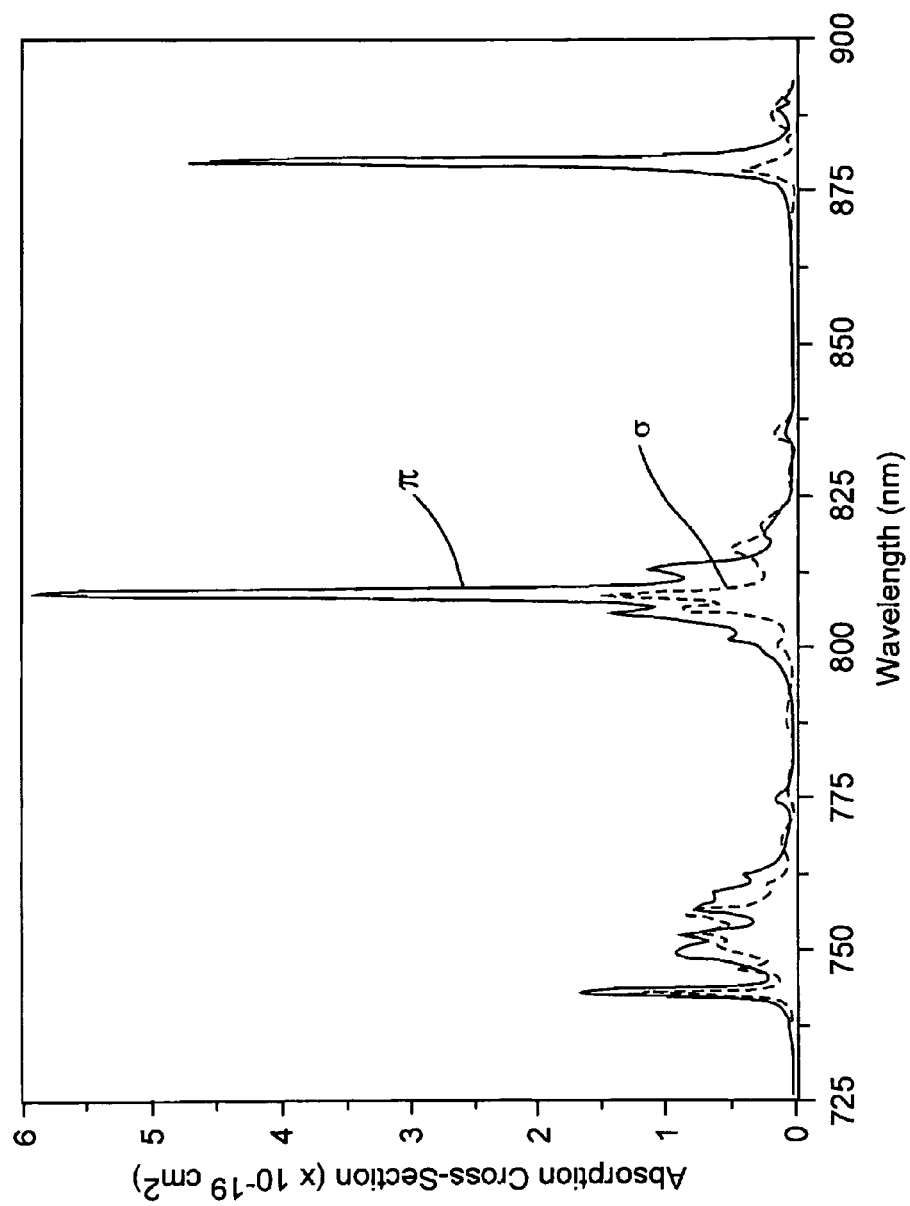
FIG. 1 is a graph reproduced from prior-art data schematically illustrating absorption as a function of wavelength for the pi and sigma polarization planes in $Nd:YVO_4$.
Figure 2:
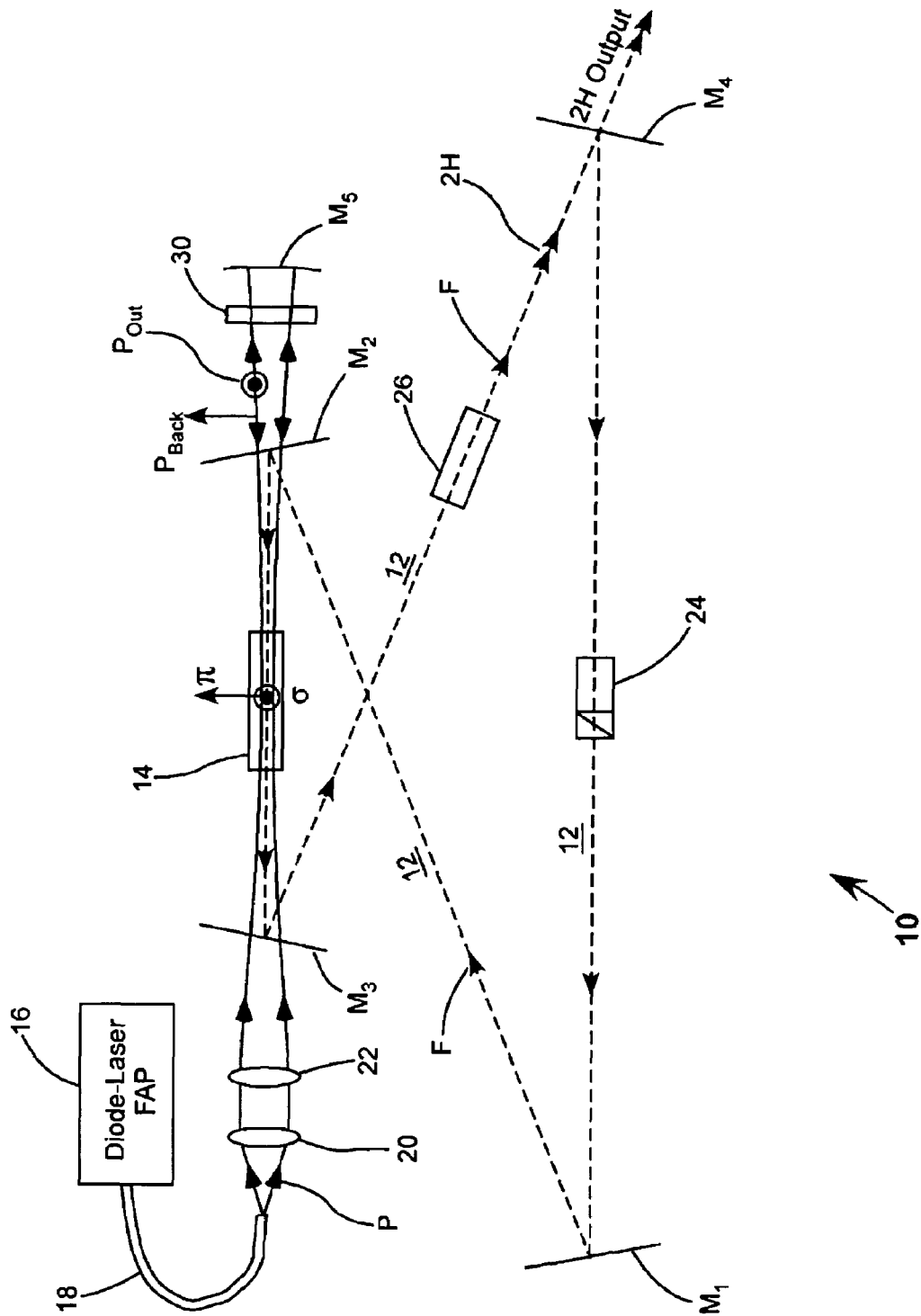
FIG. 2 schematically illustrates an intracavity-frequency-doubled ring-laser including a preferred embodiment of the pumping method of the present invention.

Referring now to the drawings, wherein like components are designated by like reference numerals, FIG. 2 schematically illustrates a intracavity-frequency-doubled ring-laser 10 including a preferred embodiment of the pumping method of the present invention. Laser 10 includes a ring resonator 12 in a configuration commonly referred to by practitioners of the art as a "bow-tie" configuration. Resonator 12 is formed by mirrors $M_1$, $M_2$, $M_3$, and $M_4$. A gain-medium 14 having a polarization sensitive absorption spectrum, for example Nd:YVO$_4$, is included in the resonator between mirrors $M_2$ and $M_3$.

Gain-medium 14 is optically pumped by a beam of pump-light P from a diode-laser fiber array package (diode-laser FAP) 16. The pump-light is delivered from the diode-laser FAP via the fiber bundle or a multi-mode transport fiber 18. Light from the transport fiber is collimated by lens 20 and focused by lens 22 to a beam waist in the gain-medium. The wavelength of pump-light P is preferably selected to match the wavelength of an absorption peak of the gain-medium, for example the 808 nm peak of Nd:YVO$_4$.

As a result of optically pumping of the gain-medium, fundamental radiation F circulates in resonator 12 along a path designated by a dashed line in FIG. 2. An optical diode 24 located in the resonator provides that the radiation circulates in one direction only. The circulating fundamental radiation is frequency-doubled by an optically non-linear crystal 26 to provide second-harmonic radiation 2H. Mirrors $M_1$, $M_2$, $M_3$ and $M_4$ are each highly reflective, for example greater than 99% reflective, for fundamental radiation F. Mirrors $M_2$ and $M_3$ are highly transmissive, for example greater than 95% transmissive, at the wavelength of pump-light P. Mirror $M_4$ is highly transmissive for the 2H-wavelength, for example greater than 99% transmissive, and is used to pass the 2H radiation out of resonator 12 as a second-harmonic output beam.

In the arrangement of FIG. 2 it is assumed, arbitrarily, that the pi ($\pi$) absorption plane of gain-medium 14 is in the plane of the drawing. The sigma ($\sigma$) absorption plane is perpendicular to the plane of the drawing. It is assumed that the pi plane is the plane of strongest absorption at the pump-light wavelength. It is also assumed that pump-light exiting transport fiber 18 is substantially depolarized. The term "substantially" is used here to recognize that the pump-light may not be completely unpolarized, i.e., it may be partially polarized with a polarization ratio other than 1:1. Light delivered from a fiber bundle, in practice, will usually have a polarization ratio less than 5:1.

In one preferred embodiment of the inventive pumping method, the length and doping concentration of gain-medium 14 are selected such that most of the $\pi$-polarized component of the pump-light is absorbed in a single pass through the gain-medium. In this case, the gain-medium acts as a polarizer and pump-light leaving the gain-medium is substantially polarized in the sigma plane of the gain-medium ($P_{Out}$). This plane-polarized light is transmitted through a birefringent element 30, preferably a quarter-wave plate, and reflected from a concave mirror $M_5$. The reflected beam $P_{Back}$ is transmitted back through the quarter-wave plate and back into gain-medium 14. Mirror $M_5$ preferably has a radius of curvature selected to match the wavefront-curvature of the pump beam $P_{Out}$ such that the reflected pump beam $P_{Back}$ is focused to a waist in the gain-medium.

As a result of the double pass through quarter-wave plate 30, the reflected pump-light reenters the gain-medium with polarization planes thereof rotated through about 90° with respect to the polarization plane of the light exiting the gain medium. This light is now substantially polarized in the pi-plane and will be essentially completely absorbed along the length of the gain-medium dependent, inter alia, on the ratio of the pi and sigma absorptions. The term "essentially completely absorbed" recognizes that the absorption process is exponential, such that absolute complete absorption could only be achieved in a rod of infinite length.

In an experiment to test the effectiveness of this approach, a Verdi™ model laser manufactured by Coherent Inc, of Santa Clara, Calif., the assignee of the present invention, was modified to accept the inventive pumping scheme. The Verdi™ laser is an intracavity-frequency-doubled laser that delivers CW single-mode radiation at a wavelength of 532 nm. This laser includes a traveling-wave ring-resonator having a configuration similar to that schematically depicted in FIG. 2. The inventive pumping system was similarly configured. The modified laser included a Nd:YVO$_4$ gain-medium having a Nd$^{3+}$ doping concentration of about 0.5 mol % and a length of 1 cm The pump-light delivered by transport fiber 18 had a wavelength of 880 nm and a power of 35 W. Output power at 532 nm was more than 10 W. The experimental laser was operated continuously for over 4000 hours without degradation.

It should be noted here that while the optical pumping method of the present invention is described above with reference in particular to optically pumping Nd:YO$_4$ at absorption-peak wavelengths, this should not be considered as limiting the method to pumping that gain-medium or to pumping at an absorption-peak wavelength. The method can be effective in pumping other gain-media with partially polarized or un-polarized light at any wavelength at which pi and sigma absorptions are different. Other gain-media that have different pi and sigma absorption spectra include, but are not limited to, Nd:YLF and Nd:YAlO$_3$. Further, the ring resonator need not be in a "bow-tie" configuration and still further, the resonator need not be a ring. If a linear laser resonator is used, it may be more convenient to include a fold mirror. In addition, although it is more convenient to re-inject the unabsorbed pump light back in the exit end of the gain medium it could also be re-injected back into the entrance end. This invention can also be useful in lasers generated a fundamental wavelength output rather than the illustrated frequency doubled output.

In summary the present invention is described above in terms of a preferred embodiment. The invention is not limited, however, to the embodiment described and depicted. Rather, the invention is limited only by the claims appended hereto.

What is claimed is:

1. A method for optically pumping a doped gain-medium with partially polarized or un-polarized pump-light having a wavelength at which the gain-medium has a stronger absorption for light polarized in a first plane relative thereto than in a second plane relative thereto and perpendicular to the first plane, the method comprising the steps of:
   directing the pump-light into the gain-medium;
   selecting a doping concentration and a length of the gain-medium such that a residual portion of the pump-light is transmitted by the gain-medium, the residual portion being substantially plane-polarized in the second plane;
   rotating the polarization-plane of the residual pump-light by about 90°; and
   re-directing the polarization-plane-rotated residual pump-light back into the gain-medium.

2. The method of claim 1, wherein the pump-light has a polarization ratio less than about 5:1.

3. The method of claim 1, wherein the gain-medium is one of Nd:YVO$_4$, Nd:YLF, and Nd:YAlO$_3$.

4. The method of claim 3, wherein the gain-medium is Nd:YVO$_4$.

5. The method of claim 4, wherein the pump-light has a wavelength of 808 nm.

6. The method of claim 4, wherein the pump-light has a wavelength of 880 nm.

7. The method of claim 1, wherein the polarization-plane rotating and residual pump-light redirecting steps include transmitting the residual pump-light transmitted by the gain-medium through a quarter-wave plate and reflecting the residual pump-light transmitted by the quarter-wave plate back through the quarter-wave plate.

8. Laser apparatus, comprising:
   a laser resonator;
   a source of pump-light, the pump-light having a pump-light wavelength;
   a doped gain-medium located in the laser resonator and having first and second ends, and having a stronger absorption at the pump-light wavelength in a first polarization plane relative thereto than in a second polarization plane perpendicular thereto;
   an arrangement for directing the pump-light into the first end of the gain-medium toward the second end of the gain-medium, the gain-medium having a doping concentration and a distance between the first and second ends of the gain-medium selected such that a portion of the pump-light is absorbed in the gain-medium and a residual portion of the pump-light which is substantially-polarized in the second plane is transmitted from the second end of the gain-medium; and
   an optical arrangement for rotating the polarization-plane of the residual pump-light by about 90 degrees and directing the polarization-plane-rotated residual pump-light back into the gain-medium via the second end thereof.

9. The apparatus of claim 8, wherein the doping concentration of the gain-medium is further selected such that essentially all of the residual pump-light directed back into the gain-medium is absorbed by the gain-medium.

10. The apparatus of claim 9, wherein the gain-medium is neodymium-doped yttrium vanadate.

11. The apparatus of claim 10, wherein the pump-light wavelength is one of 808 nm and 880 nm.

12. A method of optically pumping a gain medium which has differential pump light absorbing properties for light polarized in mutually perpendicular polarization planes comprising the steps of:
    injecting substantially unpolarized pump light into one end of the gain medium, wherein the gain-medium is one of Nd:YVO$_4$, Nd:YLF, and Nd:YAlO$_3$; and
    rotating the polarization of unabsorbed pump light exiting the other end of the gain medium by ninety degrees and re-injecting the light back into said gain medium wherein said step of rotating the polarization of the unabsorbed pump light is performed by passing the light through a quarter-wave plate on a first pass and reflecting the light so that it passes through the quarter-wave plate a second time.

13. A method as recited in claim 12, wherein said gain medium is Nd:YVO$_4$.

14. A laser comprising:
    a gain medium formed from one of Nd:YVO$_4$, Nd:YLF, and Nd:YAlO$_3$ which has differential pump light absorbing properties for light polarized in mutually perpendicular polarization planes;
    a source of pump light;
    optics for injecting pump light into one end of the gain medium, said pump light being substantially unpolarized when it enters said gain medium; and
    optics for rotating the polarization of unabsorbed pump light exiting the other end of the gain medium by ninety degrees and re-injecting the light back into said gain medium wherein the optics for rotating the polarization of the unabsorbed pump light includes a quarter-wave plate and a mirror positioned so that the light will pass through the quarter-wave plate in a first pass and then back through in the opposite direction on a second pass.

15. A laser as recited in claim 14, wherein said gain medium is Nd:YVO$_4$.

* * * * *